(12) United States Patent
Lawal et al.

(10) Patent No.: US 12,155,431 B2
(45) Date of Patent: Nov. 26, 2024

(54) BLIND SIGNAL ESTIMATION USING STRUCTURED SUBSPACE TECHNIQUE

(71) Applicant: KING FAHD UNIVERSITY OF PETROLEUM AND MINERALS, Dhahran (SA)

(72) Inventors: Abdulmajid Lawal, Dhahran (SA); Karim Abed-Meraim, Dhahran (SA); Qadri Mayyala, Dhahran (SA); Naveed Iqbal, Dhahran (SA); Azzedine Zerguine, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 20 days.

(21) Appl. No.: 18/193,990

(22) Filed: Mar. 31, 2023

(65) Prior Publication Data
US 2023/0327718 A1    Oct. 12, 2023

Related U.S. Application Data

(60) Provisional application No. 63/329,993, filed on Apr. 12, 2022.

(51) Int. Cl.
*H04B 7/0456* (2017.01)
*H04B 7/0491* (2017.01)
*H04B 7/08*   (2006.01)

(52) U.S. Cl.
CPC ........ *H04B 7/0456* (2013.01); *H04B 7/0491* (2013.01); *H04B 7/0857* (2013.01)

(58) Field of Classification Search
CPC .. H04B 7/0456; H04B 7/0491; H04B 7/0857; H04B 7/04; H04B 7/0413; H04B 7/08;
(Continued)

(56) References Cited

U.S. PATENT DOCUMENTS 7,688,910 B2 * 3/2010 Takano ................ H04B 7/0854
                                                         375/267
8,416,874 B2 * 4/2013 Wang .................. H04L 27/2607
                                                         375/267

(Continued)

OTHER PUBLICATIONS

Abdulmajid Lawal, et al., "Toeplitz structured subspace for multi-channel blind identification methods", Signal Processing, vol. 188, Issue 8, Nov. 2021, 3 pages (Abstract only).
(Continued)

*Primary Examiner* — James M Perez
(74) *Attorney, Agent, or Firm* — Oblon, McClelland, Maier & Neustadt, L.L.P.

(57) ABSTRACT

A system, method, and non-transitory computer readable medium that perform blind signal estimation for single-input multiple-output systems. The method can include receiving, by the two or more receiver antennas of the receiver, an observed signal comprising the input signal and an additive noise term. The method can then form a data matrix using the observed signals from the two or more receiver antennas. The method can also include computing a singular value decomposition of the data matrix. The singular value decomposition can then be used to generate a parameter matrix. The method can then form a Toeplitz signal matrix using the parameter matrix. The method can estimating the input signal using the Toeplitz signal matrix.

14 Claims, 12 Drawing Sheets

(58) Field of Classification Search
CPC ... H04B 7/0837; H04B 7/0842; H04B 7/0848
See application file for complete search history.

(56) References Cited

U.S. PATENT DOCUMENTS

| | | | | |
|---|---|---|---|---|
| 8,451,944 B2* | 5/2013 | Gaur | ................... | H04B 7/0426 |
| | | | | 375/350 |
| 9,008,202 B2* | 4/2015 | Vetterli | ............... | H04L 25/0202 |
| | | | | 375/260 |
| 9,077,516 B2* | 7/2015 | Tirkkonen | .......... | H04L 25/0248 |
| 9,154,263 B1* | 10/2015 | Muqaibel | .............. | H04L 1/0048 |
| 9,455,763 B2* | 9/2016 | Muqaibel | ............... | H04B 1/719 |
| 9,966,983 B2* | 5/2018 | Moher | ................ | H04B 1/0475 |
| 10,531,806 B2* | 1/2020 | Principe | ................ | A61B 5/316 |
| 10,756,790 B2* | 8/2020 | Shattil | .................... | G06N 20/00 |
| 11,184,122 B2* | 11/2021 | Sathyanarayan | ...... | H04B 1/385 |
| 11,509,368 B1* | 11/2022 | Zhang | .................. | H04B 7/0473 |
| 11,606,233 B2* | 3/2023 | Shattil | ................ | H04L 27/2614 |
| 11,616,611 B1* | 3/2023 | Stoica | .................. | H04L 5/0023 |
| | | | | 375/267 |
| 11,838,225 B2* | 12/2023 | Stoica | .................. | H04B 7/0478 |
| 11,843,482 B2* | 12/2023 | Chen | .................. | H04L 25/0248 |
| 11,848,810 B2* | 12/2023 | Sathyanarayan | ... | H04L 27/0008 |
| 2003/0112887 A1* | 6/2003 | Sang | ........................ | H04B 3/23 |
| | | | | 375/232 |
| 2004/0190636 A1* | 9/2004 | Oprea | ................... | H04B 7/0417 |
| | | | | 375/299 |
| 2007/0037540 A1* | 2/2007 | Wu | .................... | H04L 25/0204 |
| | | | | 455/306 |
| 2007/0253476 A1* | 11/2007 | Tirkkonen | ........ | H04L 25/03159 |
| | | | | 375/230 |
| 2011/0310996 A1* | 12/2011 | Raleigh | ................. | H04L 1/0065 |
| | | | | 375/295 |
| 2012/0099435 A1* | 4/2012 | Barbotin | .............. | H04J 11/0063 |
| | | | | 370/241 |
| 2013/0110478 A1* | 5/2013 | Saeed | ................. | G06F 18/2135 |
| | | | | 703/2 |
| 2013/0243046 A1* | 9/2013 | Vetterli | ............... | H04L 25/0204 |
| | | | | 375/267 |
| 2015/0280863 A1* | 10/2015 | Muqaibel | .............. | H04L 1/0048 |
| | | | | 375/350 |
| 2016/0049972 A1* | 2/2016 | Moher | ................. | H04B 1/0475 |
| | | | | 370/277 |
| 2016/0072547 A1* | 3/2016 | Muqaibel | ................. | H04J 11/00 |
| | | | | 375/138 |
| 2016/0242690 A1* | 8/2016 | Principe | ................. | A61B 5/316 |
| 2017/0284839 A1* | 10/2017 | Ojala | ...................... | H04L 67/12 |
| 2018/0139081 A1* | 5/2018 | Guvenkaya | ....... | H04L 25/03828 |
| 2018/0227005 A1* | 8/2018 | Moher | ...................... | H04L 5/14 |
| 2019/0386717 A1* | 12/2019 | Shattil | ................ | H04L 27/2602 |
| 2020/0217979 A1* | 7/2020 | Iqbal | ..................... | G01V 1/366 |
| 2020/0350966 A1* | 11/2020 | Shattil | .................... | G06N 20/00 |
| 2020/0388935 A1* | 12/2020 | Lee | ..................... | H04L 27/2634 |
| 2020/0389268 A1* | 12/2020 | Sathyanarayan | ...... | H01Q 21/28 |
| 2022/0085928 A1* | 3/2022 | Sathyanarayan | ...... | H01Q 21/28 |
| 2023/0098162 A1* | 3/2023 | Gurevitz | ................ | H04B 1/123 |
| | | | | 455/63.1 |
| 2023/0251396 A1* | 8/2023 | Iqbal | ..................... | G01V 1/288 |
| | | | | 367/38 |
| 2023/0327718 A1* | 10/2023 | Lawal | .................. | H04B 7/0491 |
| 2023/0328637 A1* | 10/2023 | Lawal | .................. | H04B 7/0413 |
| | | | | 375/267 |
| 2024/0056343 A1* | 2/2024 | Sathyanarayan | ...... | H01Q 21/28 |
| 2024/0168148 A1* | 5/2024 | Wu | ........................ | G01S 13/343 |

OTHER PUBLICATIONS

Abdelhamid Ladaycia, et al., "Efficient Semi-Blind Subspace Channel Estimation for MIMO-OFDM System", 26th European Signal Processing Conference (EUSIPCO), 2018, pp. 1292-1296.

Qadri Mayyala, et al. "Structure-Based Subspace Method for Multichannel Blind System Identification", IEEE Signal Processing Letters, vol. 24, Issue 8, Jun. 14, 2017, pp. 1183-1187 (Abstract only).

* cited by examiner

BLIND SIGNAL ESTIMATION USING STRUCTURED SUBSPACE TECHNIQUE

CROSS REFERENCE TO RELATED APPLICATIONS

The present application claims the benefit of priority to U.S. Prov. App. No. 63/329,993, entitled "Blind Adaptive Channel Estimation Using Structure Subspace Tracking", filed on Apr. 12, 2022, and incorporated herein by reference in its entirety.

STATEMENT OF PRIOR DISCLOSURE BY AN INVENTOR

A. Lawal, Q. Mayyala, K. Abed-Meraim, N. Iqbal and A. Zerguine, "Blind Signal Estimation Using Structured Subspace Technique," in *IEEE Transactions on Circuits and Systems II. Express Briefs*, vol. 68, no. 8, pp. 3007-3011, 2021, doi: 10.1109/TCSII.2021.3065385 incorporated herein by reference in its entirety.

STATEMENT OF ACKNOWLEDGEMENT

The inventors acknowledge the financial support provided by provided by the Deanship of Scientific Research of King Fand University of Petroleum and Minerals (KFUPM), Riyadh, Saudi Arabia under Research Grant SB181001.

BACKGROUND

Technical Field

The present disclosure is directed to blind signal estimation of single-input multiple-output (SIMO) finite impulse response (FIR) systems.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Blind system identification has application in a wide variety of fields, such as in satellite communication, image processing, seismic exploration, and biomedical image processing. Conventional methods for blind system identification transmit a known training sequence to a receiver that is then used for channel estimation. The obtained channel information is then used to estimate the transmitted signal. Such methods are widespread due to their simplicity, but have inefficiencies when it comes to bandwidth, power, and channel throughput. Moreover, there are some applications in which training sessions are not able to be used, such as in asynchronous wireless networks. Methods that do not require training sessions are preferable.

Blind system identification can be seen as an identification of channels and/or input signals, based only on the available output signals, with several algorithms taking different approaches. Several second-order statistics-based approaches have been employed, such as standard subspace (SS), cross-correlation (CR), two-step maximum likelihood (SS), cross-correlation (CR), two-step maximum likelihood (MR), and truncated transfer method (TTM). Of particular interest is the SS method, which is efficient in terms of estimation accuracy. Further developments of the SS method have led to a single-input multiple-output (SIMO) structure channel subspace (SCS) method for channel identification in a SIMO system. Of the listed methods, the SS, CR, TTM, and the SCS methods can be categorized as an "indirect method" that estimates the channel, then the output signal. The MRE methods has the desirable quality in that it is a "direct method" that can directly estimate the signal.

Each of the aforementioned methods for blind signal identification suffers from one or more drawbacks hindering their adoption. Accordingly, it is one object of the present disclosure to provide methods and systems for improved blind system identification, and in particular, direct estimation of the signal is desirable.

SUMMARY

In an exemplary embodiment method for blind signal estimation for single-input multiple-output systems performed by a receiver is provided. The method comprises receiving, by two or more receiver antennas of the receiver, an observed signal comprising an input signal and an additive noise term. The method can then include forming a data matrix using the observed signals from the two or more receiver antennas computing a singular value decomposition of the data matrix. The method can then include generating a parameter matrix using matrices obtained from the singular value decomposition of the data matrix. The method can then include forming a Toeplitz signal matrix using the parameter matrix and estimating the input signal using the Toeplitz signal matrix.

In another exemplary embodiment, a system for blind signal estimation is provided. The system comprises a transceiver comprising a transmitter antenna configured to transmit an input signal to a receiver. The system can also include the receiver comprising two or more transmitter antennas configured to receive the input signal and a processing module configured to perform a method including: receiving, by the two or more receiver antennas of the receiver, an observed signal comprising the input signal and an additive noise term; forming a data matrix using the observed signals from the two or more receiver antennas; computing a singular value decomposition of the data matrix; generating a parameter matrix using matrices obtained from the singular value decomposition of the data matrix; forming a Toeplitz signal matrix using the parameter matrix; and estimating the input signal using the Toeplitz signal matrix.

In yet another exemplary embodiment, a non-transitory computer readable medium having instructions stored therein that, when executed by one or more processors, cause the one or more processors to perform a method including: receiving, by two or more receiver antennas of the receiver, an observed signal comprising an input signal and an additive noise term; forming a data matrix using the observed signals from the two or more receiver antennas; computing a singular value decomposition of the data matrix; generating a parameter matrix using matrices obtained from the singular value decomposition of the data matrix; forming a Toeplitz signal matrix using the parameter matrix; and estimating the input signal using the Toeplitz signal matrix.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
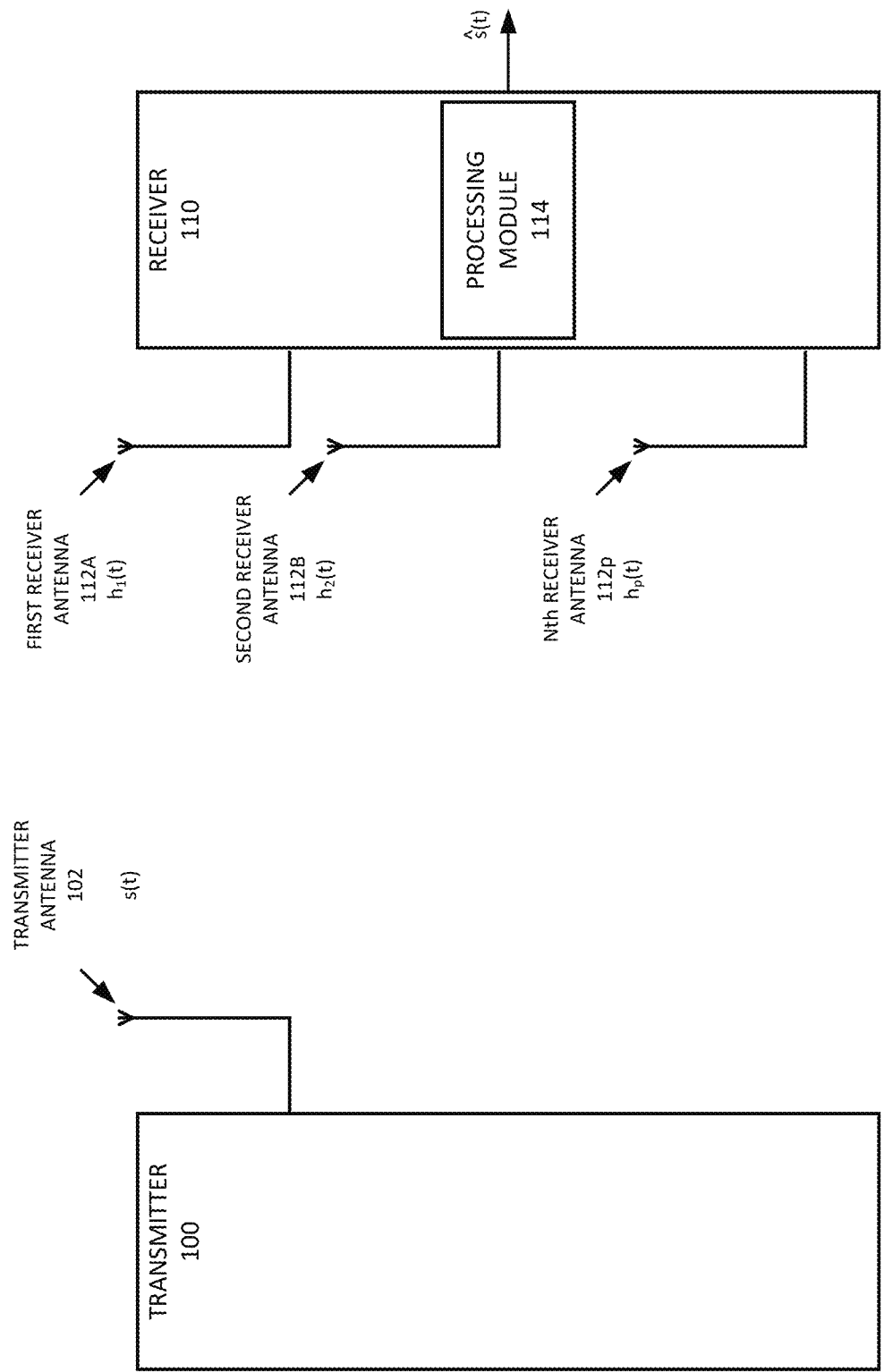
FIG. 1 shows a block diagram of a single-input multiple-output system according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to a system, device, and method for blind signal estimation of a single-input multiple-output (SIMO) finite impulse response (FIR) system. Embodiments can be used in communications, image processing, or anywhere a signal is received by a receiver. Embodiments directly estimate input signals with no need for channel estimation, or the estimation of second-order statistics. Embodiments exploit the Toeplitz structure that is inherent in the signal's linear model. Embodiments provide a number of advantages over conventional methods. Embodiments provide for lower latency and lessen the impact of error propagation, which is common in ill-conditioned channels or weak channel estimations. Further, embodiments show high performance under adverse scenarios such as in short-burst communications and poor channel diversity.

FIG. 1 shows a block diagram of a single-input multiple-output system according to certain embodiments. The single-input multiple-output system can comprise a transmitter 100 and a receiver 110. The transmitter 100 can comprise a transmitter antenna 102. The transmitter antenna 102 can transmit an input signal s(t) to the receiver 110. The receiver 110 can comprise a plurality of receiver antennas, shown as a first receiver antenna 112A, a second receiver antenna 112B, and an p-th receiver antenna 112p, and a processing module 114. Each of the receiver antenna can have a linear channel hi(t) that receives input signals. Although the receiver 110 is shown to have three receiver antennas in FIG. 1, the receiver 100 can comprise any suitable number of receiver antennas, such as 2, 4, 8, 16, 32, 64, 128, or 256. The processing module 114 can be used to perform computations and methods described herein. For example, the processing module 114 can enable the receiver 110 to perform the method described by FIG. 2.

The receiver 100 can receive the input signal s(t) using the array of receiver antennas. The input signal s(t) can pass through an unknown linear channel h(t) and be received in the presence of additive white Gaussian noise w(t) to yield the observed signal y(t) shown below:

$$y(t)=\Sigma_{k=0}^{L-1}h(k)s(t-k)+w(t), t=0,\ldots,N-1 \quad (1)$$

where h(k) is the finite impulse response (FIR) channel, L−1 is the channel order, and N is the total length of the sample. For p number of antenna, the model can be modified as follows:

$$y(t)=\Sigma_{k=0}^{L-1}h(k)s(t-k)+w(t), t=0,\ldots,N-1 \quad (2)$$

where $y(t)=[y_1(t),\ldots,y_p(t)]^T$ is the vector collection of the p overserved signals, $h(t)=[h_1(t),\ldots,h_p(t)]^T$ is the vector collection of the p different channels, and $w(t)=[w_1(t),\ldots,w_p(t)]^T$ is the noise associated with each of the p different channels.

Assuming a reception of a window of $N_w$ samples, the data can be stacked into a vector/matrix representation as follows:

$$y_{N_w}(t)=H_{N_w}(h)s_{N_w+L-1}(t)+w_{N_w}(t) \quad (3)$$

where $y_{N_w}(t)=[y^H(t),\ldots,y^H(t-N_w+1)]^H$, $s_{N_w+L-1}(T)=[s(t),\ldots,s(t-N_w-L+2)]^H$, $w_{N_w}(t)=[w^H(t),\ldots,w^H(t-N_w+1)]^H$, and $H_{N_w}(h)$ is a $pN_w \times (N_w+L-1)$ block Toeplitz matrix (i.e., the channel matrix) define by the following equation.

$$H_{N_w}(h) = \begin{bmatrix} h(0) & \ldots & h(L-1) & 0 \\ \vdots & \ddots & \vdots & \vdots \\ 0 & \ldots & h(0) & h(L-1) \end{bmatrix} \quad (4)$$

Considering the whole set of N samples, equation (3) can be rewritten to form a data matrix Y as:

$$Y=[y_{N_w}(N_w-1)y_{N_w}(N_w)y_{N_w}(N-1)].$$

$$Y=H_{N_w}(h)S_K+W_{N_w} \quad (5)$$

where the signal matrix $S_K$ is defined as:

$$S_K = \begin{bmatrix} s(N_w-1) & s(N_w) & \ldots & s(N-1) \\ s(N_w-2) & s(N_w-1) & \ldots & s(N-2) \\ \vdots & \vdots & \vdots & \vdots \\ s(N_w-K) & s(N_w-K+1) & \ldots & s(N-K) \end{bmatrix} \quad (6)$$

Here, $K=N_w+L-1$ and the matrix $S_K$ has a dimension of $(N_w+L-1)\times(N-N_w+1)$. The matrix $W_{N_w}$ has the same dimensions as the matrix Y. Embodiments aim to estimate the input signal up to the inherent scalar ambiguity. The following assumptions are made: (1) the set of input symbols is large enough for the matrix $S_K$ to be full row rank; (2) the complex noise vector $w_{N_w}(t)$ is temporary white, zero mean, and has a covariance matrix equal to $\delta_{jk}\sigma_w^2 I_p$ where $I_p$ is the identity matrix of size p; (3) the input signal and noise are independent; and (4) the block-Toeplitz matrix related to $H_{N_w}(h)$ has full column rank.

One existing approach, the subspace (SS) described in E. Moulines, P. Duhamel, J.-F. Cardoso, and S. Mayrargue, "Subspace methods for the blind identification of multichannel FIR filters," *IEEE Trans. Signal Process*, vol. 43, no. 2, pp. 516-525, February 1995), which is incorporated herein by reference. The SS method exploits the Toeplitz structure of the channel matrix. The SIMO structure channel subspace (SIMO-SCS), as described in Q. Mayyala, K. Abed-Meraim, and A. Zerguine, "Structure-based subspace method for multichannel blind system identification," *IEEE Signal Process. Lett.*, vol. 24, no. 8, pp. 1183-1187, August 2017, which is incorporated herein by reference, method exploits both the Toeplitz structure of the channel matrix and the orthogonality criterion. One method to find the orthogonal component of $H_{N_w}(h)$ is through signal-noise decomposition. The received signal covariance matrix is $R_y = E[y_{N_w}(t)y_{N_w}^H(t)]$ is obtained from the multichannel model as follows:

$$R_y = H_{N_w}(h) R_s H_{N_w}^H(h) + \sigma_w^2 I \quad (7)$$

where $R_s$ represents the input signal covariance matrix. The singular value decomposition (SVD) of $R_y$ is given as:

$$R_y = V_s \text{diag}(\lambda_1^2, \ldots, \lambda_K^2) V_s^H + \sigma_w^2 V_w V_w^H \quad (8)$$

where $\lambda_i$ for $i=1, \ldots, K$ are the principal eigenvalues of the covariance matrix $R_y$. Also, the columns of $V_s$ and $V_w$ span the signal and noise subspaces (the orthogonal complement), respectively.

Following similar logic, embodiments can exploit the Toeplitz structure of the signal matrix of equation (6) to estimate the signal directly instead of the channel. As such embodiments can thus estimate the signal directly without any prior knowledge or estimation of the channel. Among other benefits, this choice reduces errors that may be introduced due to the inversion of the estimated channel and avoids delay ambiguity that is often encountered. Further, the implementation of embodiments retains simplicity, and provides robustness to ill conditions channels.

Embodiments can directly obtain the SVD of the data matrix Y as:

$$Y = U \Sigma V^H \quad (9)$$

where U is a unitary matrix containing left singular vectors and has a dimension of $pN_w \times pN_w$, $\Sigma$ is a diagonal matrix of dimension $pN_w \times D$ (with $D = N - N_w + 1$) that contains all of the corresponding singular values, and V is a square unitary matrix of dimension $D \times D$ that contains right singular vectors. In the noiseless case (or asymptotically), the subspace spanned by the rows of the signal matrix $S_K$ coincide with the subspace spanned by the rows of $V_s^H$, which is the matrix formed by the first K rows of $V^H$. Embodiments can thus directly search for the signal in the form of $\hat{S}_K = QV_s^H$. Here, Q can be chosen such that the Toeplitz structure of the signal matrix, given by equation (6), is preserved. This is achieved by minimizing the following structure-based cost function with respect to the square matrix Q shown below.

$$J = \sum_{j=1}^{K-1} \sum_{i=1}^{D-1} |\hat{s}(i,j) - \hat{s}(i+1,j+1)|^2 \quad (10)$$

In this case, $\hat{s}(i,j)$ refers to the (i,j)-th entry of the estimated signal $\hat{S}_K$. The cost function is built based on the Toeplitz structure of the signal matrix that is given in equation (6). The cost function J can be written in a compact form as:

$$J = \|J_D \hat{S}_K \tilde{J}_K - \tilde{J}_K \hat{S}_K \tilde{J}_K\|^2 \quad (11)$$

where $J_D \hat{S}_K J_K$ is the top left submatrix of $\hat{S}_K$ and $\tilde{J}_K \hat{S}_K \tilde{J}_K$ is the bottom right submatrix of $\hat{S}_K$. The left selection matrices are defined as $J_D = [I_{D-1} 0_{(D-1),1}]$, where $0_{(D-1),1}$ is an all zero column vector that contains zeros of dimension $(D-1) \times 1$, $I_{D-1}$ is a square identity matrix of size $(D-1)$, and $J_K = [I_{K-1} \ 0_{1,(K-1)}]^T$. The right selection matrices are defined as $\tilde{J}_D = [0_{(D-1),1} I_{D-1}]$ and $\tilde{J}_K = [0_{1,(K-1)} I_{K-1}]^T$.

The Kronecker product property of $\text{vec}(ABC) = ((C^T \otimes A) \text{vec}(B)) = ((C^T \otimes A)b)$ can be applied to equation (11) to lead to equation (12) below.

$$J = \|((V_s^H J_K)^T \otimes J_D - (V_s^H \tilde{J}_D)) \text{vec}(Q)\|^2$$

$$J = \|Kq\|^2 \quad (12)$$

The smallest eigenvalue of $K^H K$ corresponds to an eigenvector that is the optimal solution of the parameter vector q, under the unit norm constraint. The parameter vector q is then reshaped into the parameter matrix Q with a dimension of $K \times K$. Once the parameter matrix Q is obtained, the signal is estimated by averaging over the diagonals of the Toeplitz signal matrix $\hat{S}_K = QV_s^H$.

Figure 2:
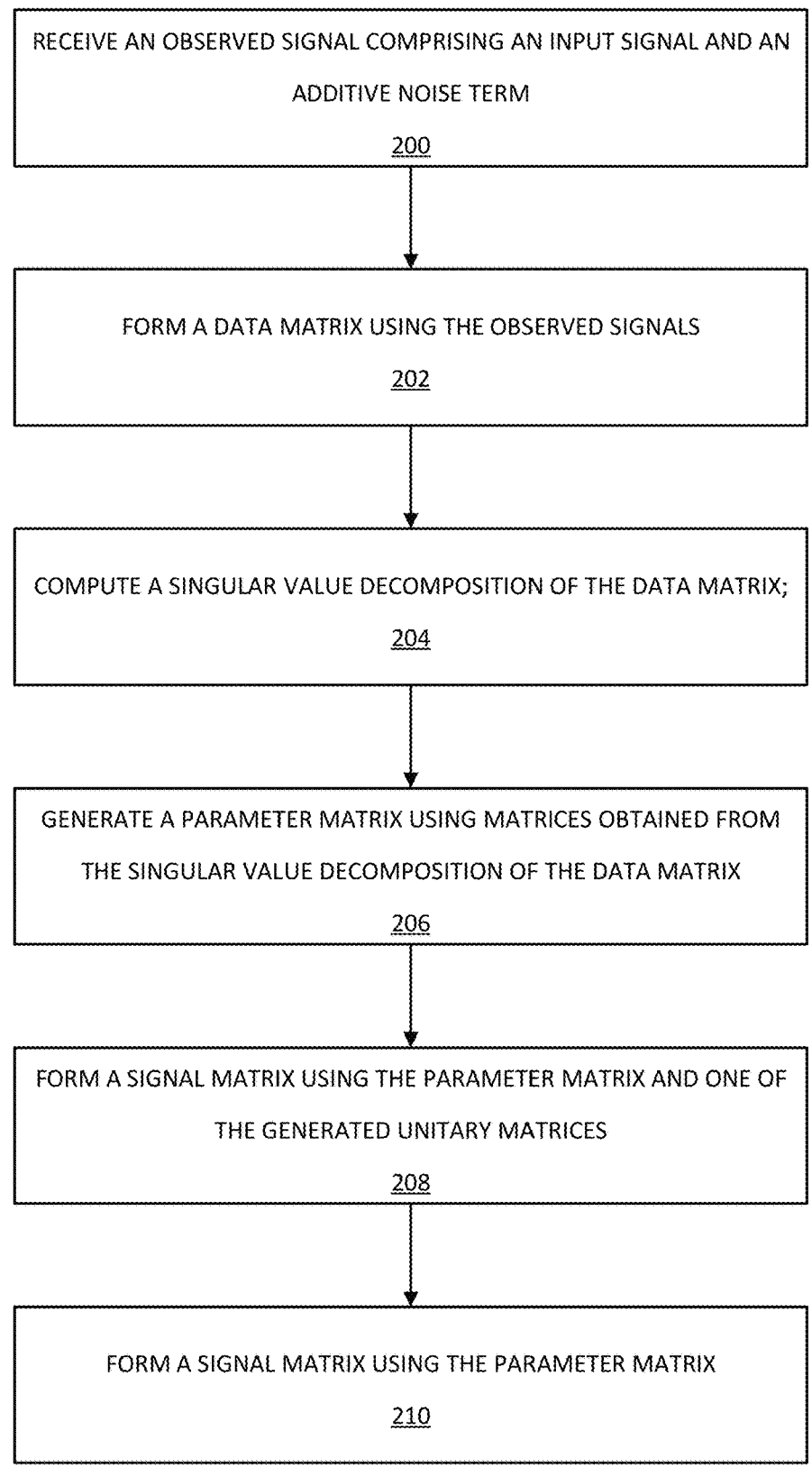
FIG. 2 shows a method for blind signal identification in single-input multiple-output finite impulse response systems according to certain embodiments.

FIG. 2 shows a method for blind signal identification in single-input multiple-output finite impulse response systems according to certain embodiments. The method can be performed between the transceiver 100 and receiver 110 of FIG. 1. In one example, both the transceiver 100 and the receiver 110 can be mobile phones communicating over a short- or long-range communication medium (e.g., Bluetooth, the Internet, etc.). The transceiver 100 can transmit and input signal to the receiver 110 (e.g., the signal s(t) as shown in FIG. 1). In some examples, the input signal can comprise image data. For example, the transceiver 100 can transmit a photo by transmitting an image data matrix to the receiver 110. The receiver 110 may then use the processing module 114 to perform the steps of the method below.

In step 200, the receiver 110 can receive an observed signal using two or more receiver antennas (e.g., the first receiver antenna 112A, the second receiver antenna 112B, the p-th antenna 112p). The observed signal can have the form of equation (1), which comprises a first term that includes the product between the input signal and a channel term (i.e., h(k)s(t−K)), and an additive noise term (i.e., w(t)). The additive noise term can be white Gaussian noise and may be zero mean or be asymptotically zero. Each of the two or more receiver antennas of the receiver 110 can measure N samples of the input signal. For example, in simulations provided, N=100 and N=30 are used.

In step 202, the receiver 110 can form a data matrix using the observed signals. For example, the receiver 110 can form a signal vector $y_{N_w}(t)$ by grouping the observed signals from each of the two or more antenna, as is described by equation (3). The signal vectors can then be aggregated to form the data matrix Y, as described by equation (5).

In step 204, the receiver 110 can compute a singular value decomposition of the data matrix. The singular value decomposition of the data matrix can result in two unitary matrices and is described by equation (9). Of particular interest is the matrix $V^H$ and the subsequent matrix $V_s^H$ that comprise the right singular vectors.

In step 206, the receiver 110 can generate a parameter matrix using the matrices obtained from the singular value decomposition of the data matrix. The receiver 110 can minimize the cost function described by equation (12) to generate a parameter vector q. The parameter vector can then be reshaped to form the parameter matrix Q.

In step 208, the receiver 110 can form a signal matrix using the parameter matrix and one of the generated unitary matrices. The signal matrix can be formed by multiplying the parameter matrix with the generated unitary matrix comprising the right singular vectors (i.e., $\hat{S}_K = Q\hat{V}_s^H$).

In step 210, the receiver 110 can then estimate the input signal. For example, the receiver 110 can estimate over the diagonals of the signal matrix.

The dominant source of computational complexity in SS, SCS, and TTM algorithms follows from the computation of the square sample correlation matrix shown in equation (7) with a cost $pN_w(N-N_W+1)$, and finding the corresponding SVD decomposition shown in equation (8) with a cost of $O(pN_w)^3$. Embodiments do not incur this cost, as embodiments directly estimate the signal without need of first estimating the channel. Further computations are saved by embodiments, as the above algorithms use a further equalization step to recover the transmitted signal.

Embodiments can efficiently estimate the transmitted signal blindly and directly without knowledge of the channel matrix. Moreover, there is no estimation of the correlation matrix of the received signal. Embodiments are deterministic, which provides superior performance over other conventional algorithms and is especially true for short burst signals. Embodiments are simple to implement and does not posses delay ambiguity. Embodiments can also be used for estimation with other matrix structures, where the SS method is applicable.

FIGS. 3-8 simulate the performance of embodiments (denoted as SSS in the FIGs.) and compare the results to those achieved by traditional methods. The symbol error rate (SER) is deployed as the performance metric for the simulations, which is a ratio of the total number of wrongly detected symbols to that of total transmitted symbols. A 4-QAM excitation signal is used to illustrate the validity of embodiments. The performance of embodiments is compared to that of the SS method, the SCS method, the TTM method, and the MRE method. Embodiments and the MRE method directly estimate the signal, while the SS, the SCS, and the TTM method first estimate the channel then use the channel information to estimate the signal. Two second order impulse response FIR channels are considered that are defined by the following two equations.

$$h_1 = [1 -2\cos\theta 1]^T$$

$$h_2 = [1 -2\cos(\theta+\alpha)1]^T$$

The absolute phase value of the zeros of $h_1$ are represented by θ and the angular distance between the zeros of the two-channel is represented by α. An ill-conditioned system occurs when α is small (i.e., the distance between the zeros of the two channels is small, typically of order $10^{-1}$ or less). Conversely, the system is well-conditioned when α is large (typically in the range of π/6 to π/2). The SER is averaged over 100 Monte Carlo runs. The 4-QAM input signal and the additive noise are randomly generated for each Monte Carlo run. The data size used in the simulations is N=100 and the window is chosen to be $N_w=5$ unless noted otherwise.

Figure 3:
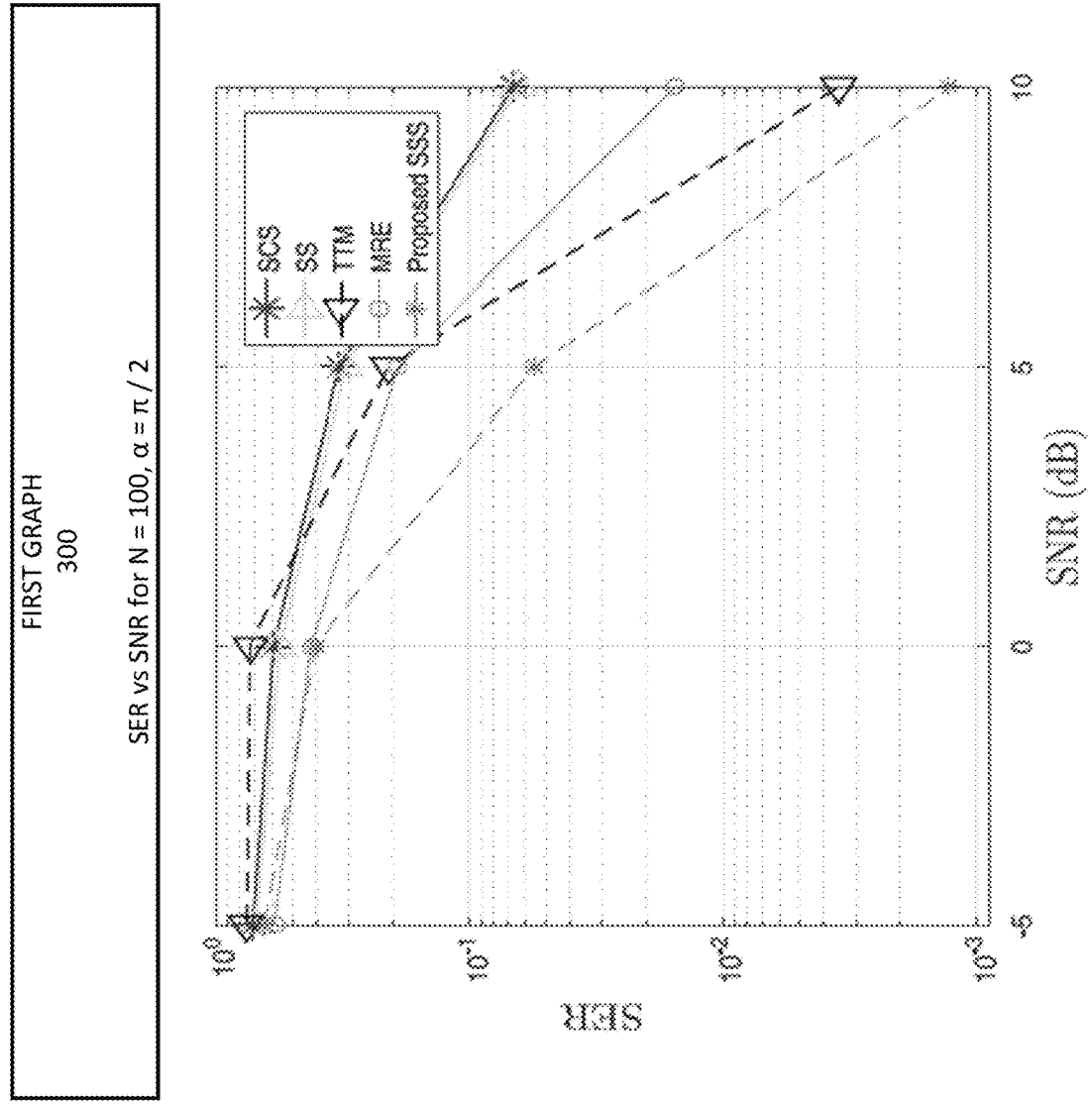
FIG. 3 shows a first graph according to certain embodiments.

FIG. 3 shows a first graph 300 according to certain embodiments. The system is considered well-conditioned, with a channel diversity given by α=π/2. As illustrated by the first graph 300, embodiments (denoted by SSS) outperform the conventional methods.

Figure 4:
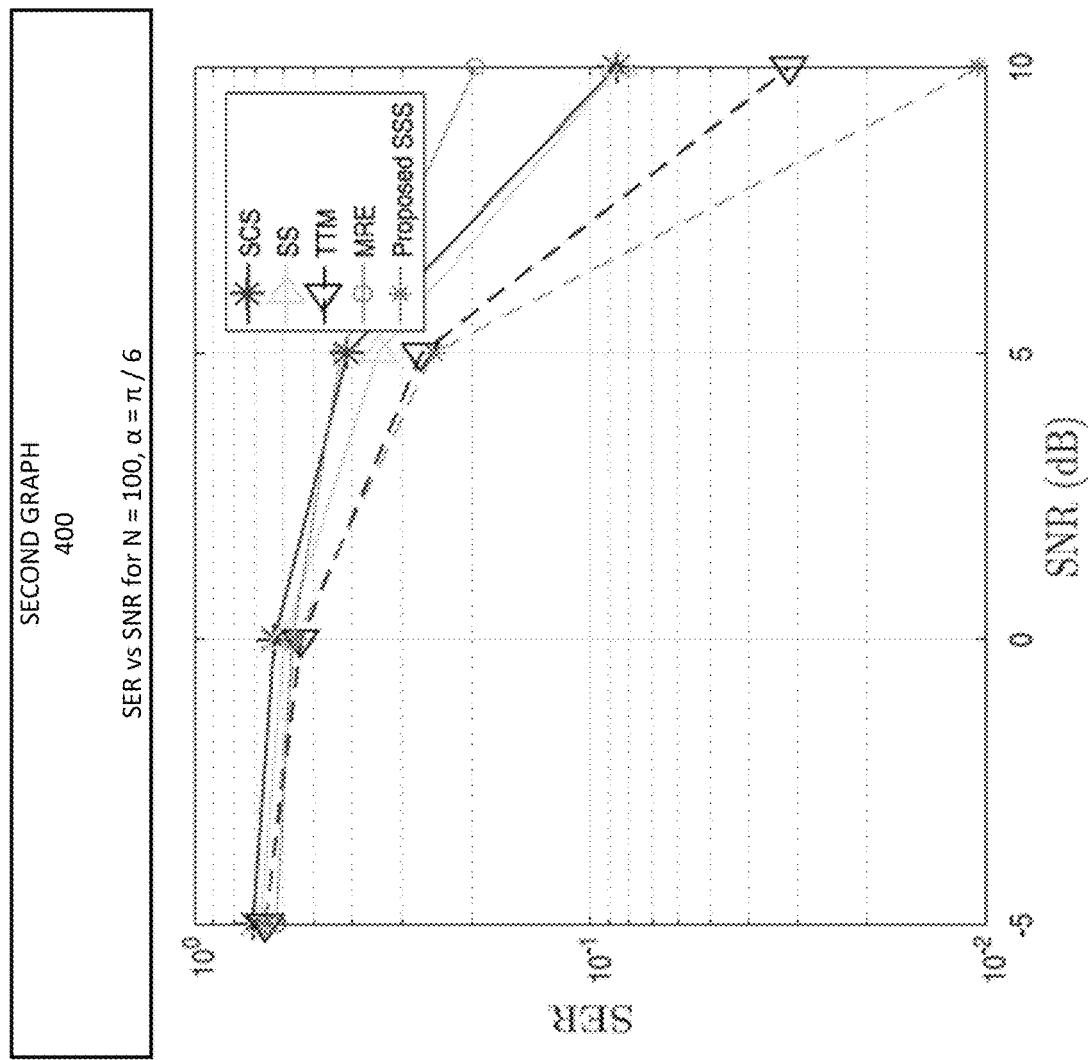
FIG. 4 shows a second graph according to certain embodiments.

FIG. 4 shows a second graph 400 according to certain embodiments. The system is considered ill-conditioned, with a channel diversity given by α=π/6. Although the system is ill-conditioned, embodiments are robust and provide good performance over indirect methods (i.e., over SS, SCS, and TTM) and is comparable with MRE.

Next, a reduced sample size is considered to test the performance of embodiments in the presence of a short data burst.

Figure 5:
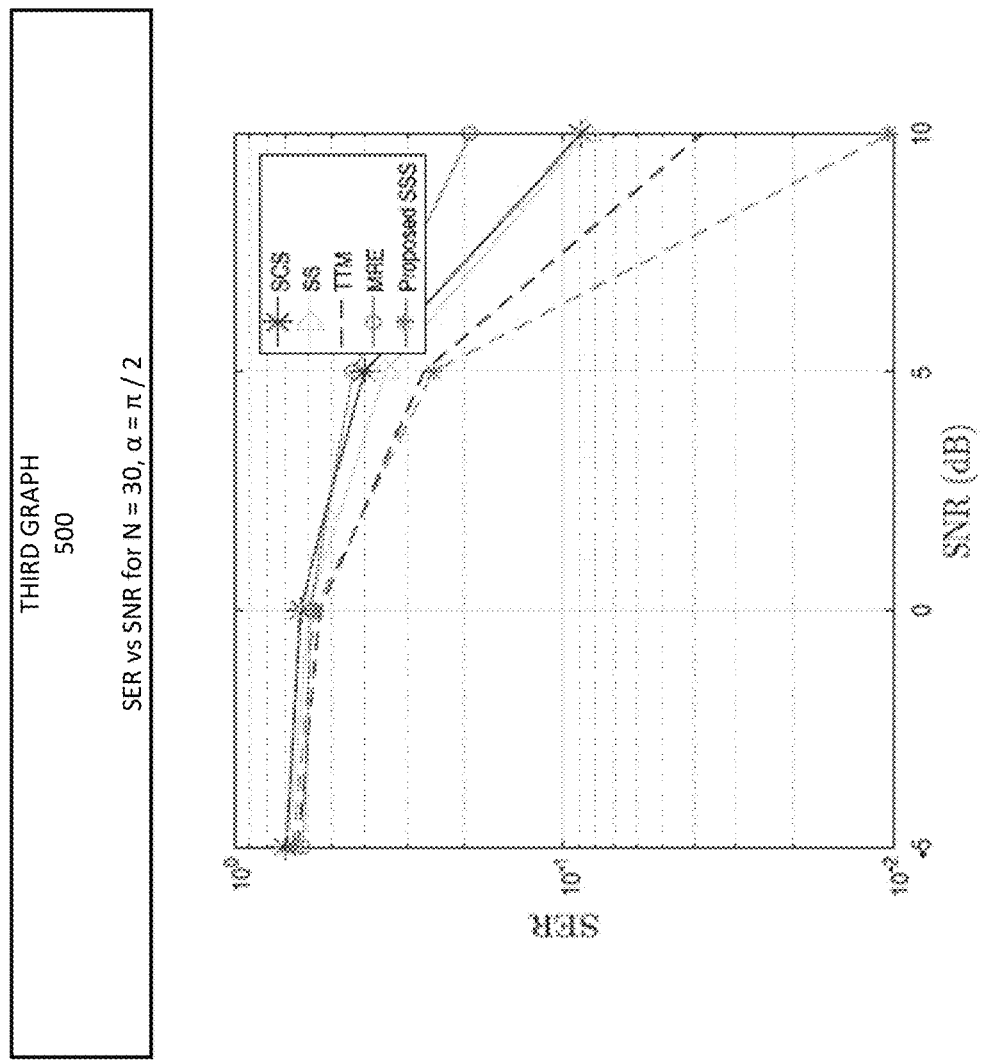
FIG. 5 shows a third graph according to certain embodiments.

FIG. 5 shows a third graph 500 according to certain embodiments. The third graph 500 shows the SER against the SNR for the short data burst. Embodiments consistently outperform indirect methods at moderate/high values for SNR.

Embodiments are then tested for a fading channel. The fading channel considered is a two Raleigh channel (i.e., p=2), with a channel length of L=3.

Figure 6:
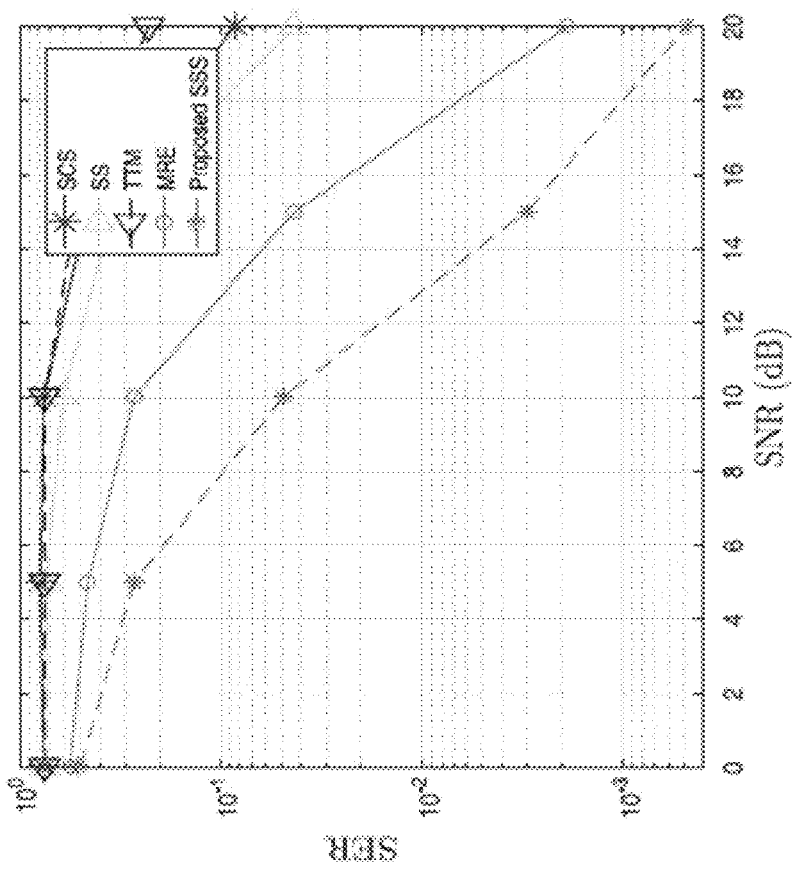
FIG. 6 shows a fourth graph according to certain embodiments.

FIG. 6 shows a fourth graph 600 according to certain embodiments. The fourth graph 600 shows the simulation result obtained for the fading channel. Embodiments consistently outperforms other methods and does not degrade as much in performance for higher SNR values.

The robusticity to channel length of embodiments are tested. A channel is randomly generated for increments between L=3 and L=6 while the SNR is fixed at 10 dB.

Figure 7:
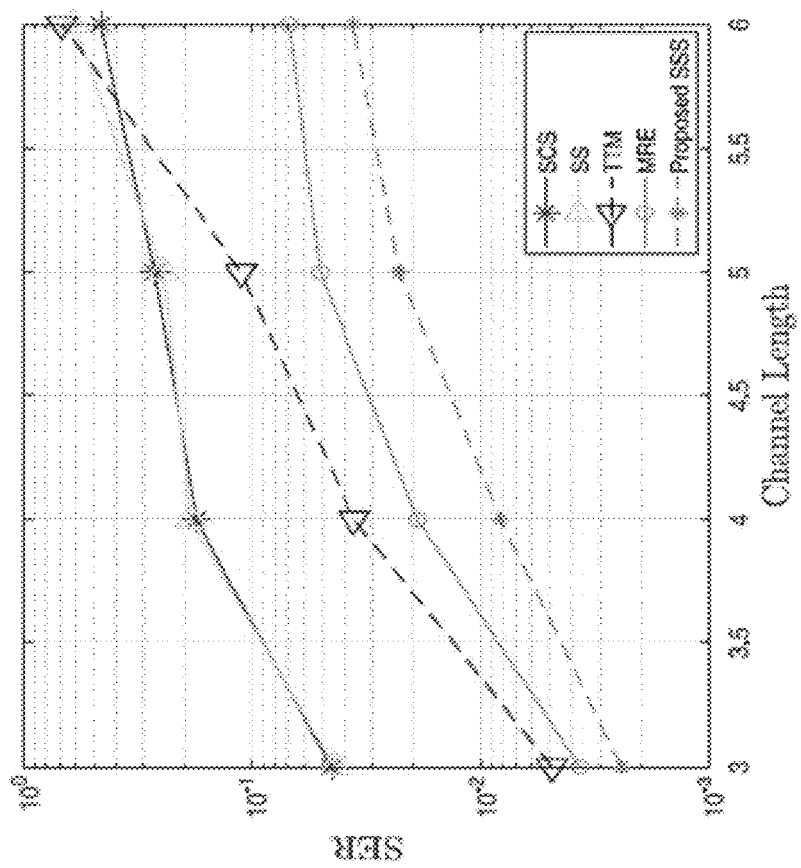
FIG. 7 shows a fifth graph according to certain embodiments.

FIG. 7 shows a fifth graph 500 according to certain embodiments. The channel length is varied by increments of 0.5. As is seen in the fifth graph 500, embodiments outperform other methods even as channel length is increased.

Finally, embodiments are tested by increasing the number of receiver antennas. The number of receiver antenna are increased to p=3. The third channel is defined by the following:

$$h_3 = \left[1 \quad -2\cos\left(\theta + \frac{3\pi}{2}\right) \quad 1\right]^T$$

Figure 8:
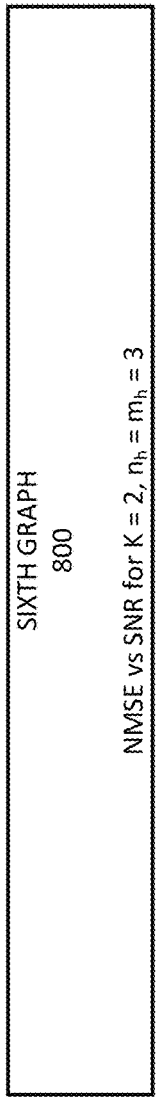
FIG. 8 shows a sixth graph according to certain embodiments.
Figure 8:
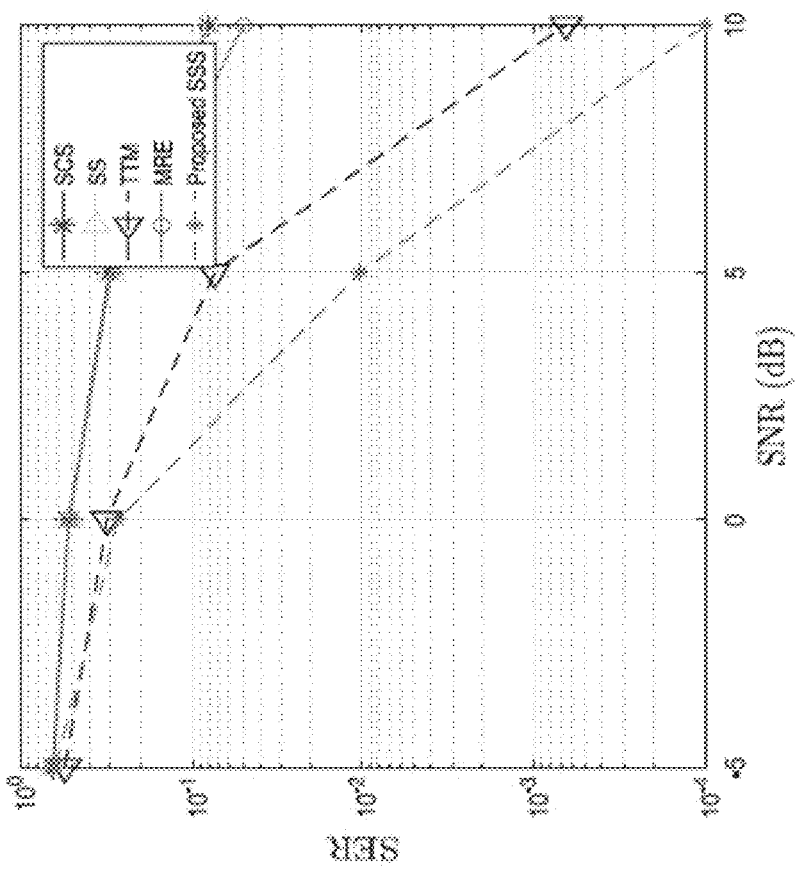

FIG. 8 shows a sixth graph 600 according to certain embodiments. Here, three channels are used (i.e., p=3). Embodiments provide a consistent increase in performance over other methods.

Next, further details of the hardware description of the computing environment according to exemplary embodiments is described with reference to FIG. 9. The devices of FIG. 1 can be similar to those shown in FIG. 1. Each device can include a CPU 901 which performs the processes described above/below. The process data and instructions may be stored in memory 902. These processes and instructions may also be stored on a storage medium disk 904 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 901, 903 and an operating system such as Microsoft Windows 7, Microsoft Windows 10, Microsoft Windows 11, UNIX, Solaris, LINUX, Apple MAC-OS and other systems known to those skilled in the art.

The hardware elements in order to achieve the computing device may be realized by various circuitry elements, known to those skilled in the art. For example, CPU 901 or CPU 903 may be a Xenon or Core processor from Intel of America or an Opteron processor from AMD of America, or may be other processor types that would be recognized by one of ordinary skill in the art. Alternatively, the CPU 901, 903 may be implemented on an FPGA, ASIC, PLD or using discrete logic circuits, as one of ordinary skill in the art would recognize. Further, CPU 901, 903 may be implemented as multiple processors cooperatively working in parallel to perform the instructions of the inventive processes described above.

Figure 9:
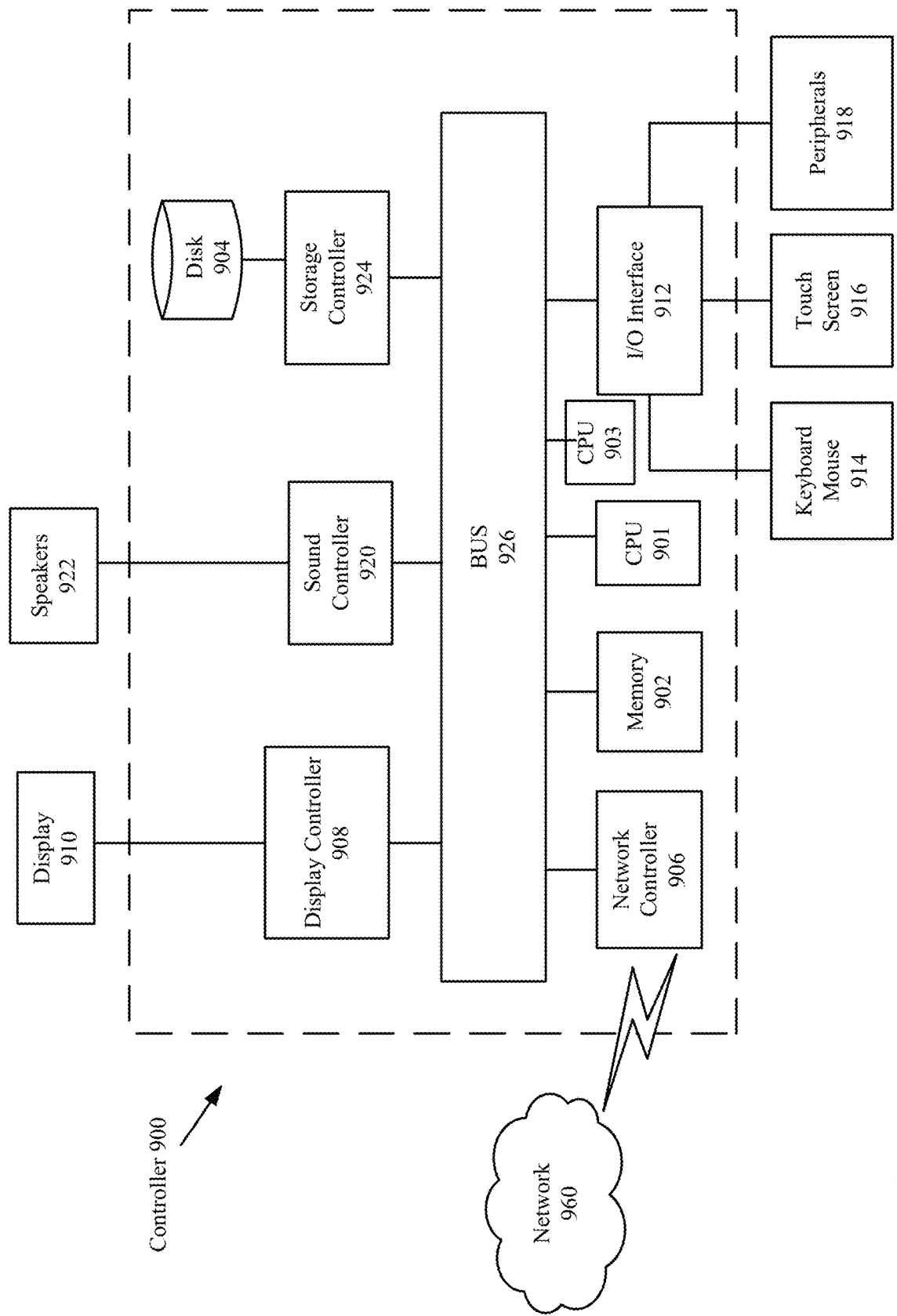
FIG. 9 is an illustration of a non-limiting example of details of computing hardware used in the computing system, according to certain embodiments.

The computing device in FIG. 9 also includes a network controller 906, such as an Intel Ethernet PRO network interface card from Intel Corporation of America, for interfacing with network 960. As can be appreciated, the network 960 can be a public network, such as the Internet, or a private network such as an LAN or WAN network, or any combination thereof and can also include PSTN or ISDN subnetworks. The network 960 can also be wired, such as an Ethernet network, or can be wireless such as a cellular network including EDGE, 3G, 4G and 5G wireless cellular systems. The wireless network can also be WiFi, Bluetooth, or any other wireless form of communication that is known.

The computing device further includes a display controller 908, such as a NVIDIA GeForce GTX or Quadro graphics adaptor from NVIDIA Corporation of America for interfacing with display 910, such as a Hewlett Packard HPL2445w LCD monitor. A general purpose I/O interface 912 interfaces with a keyboard and/or mouse 914 as well as a touch screen panel 916 on or separate from display 910. General purpose I/O interface also connects to a variety of peripherals 916 including printers and scanners, such as an OfficeJet or DeskJet from Hewlett Packard.

A sound controller 920 is also provided in the computing device such as Sound Blaster X-Fi Titanium from Creative, to interface with speakers/microphone 922 thereby providing sounds and/or music.

The general purpose storage controller 924 connects the storage medium disk 904 with communication bus 926, which may be an ISA, EISA, VESA, PCI, or similar, for interconnecting all of the components of the computing device. A description of the general features and functionality of the display 910, keyboard and/or mouse 914, as well as the display controller 908, storage controller 924, network controller 906, sound controller 920, and general purpose I/O interface 912 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 10.

Figure 10:
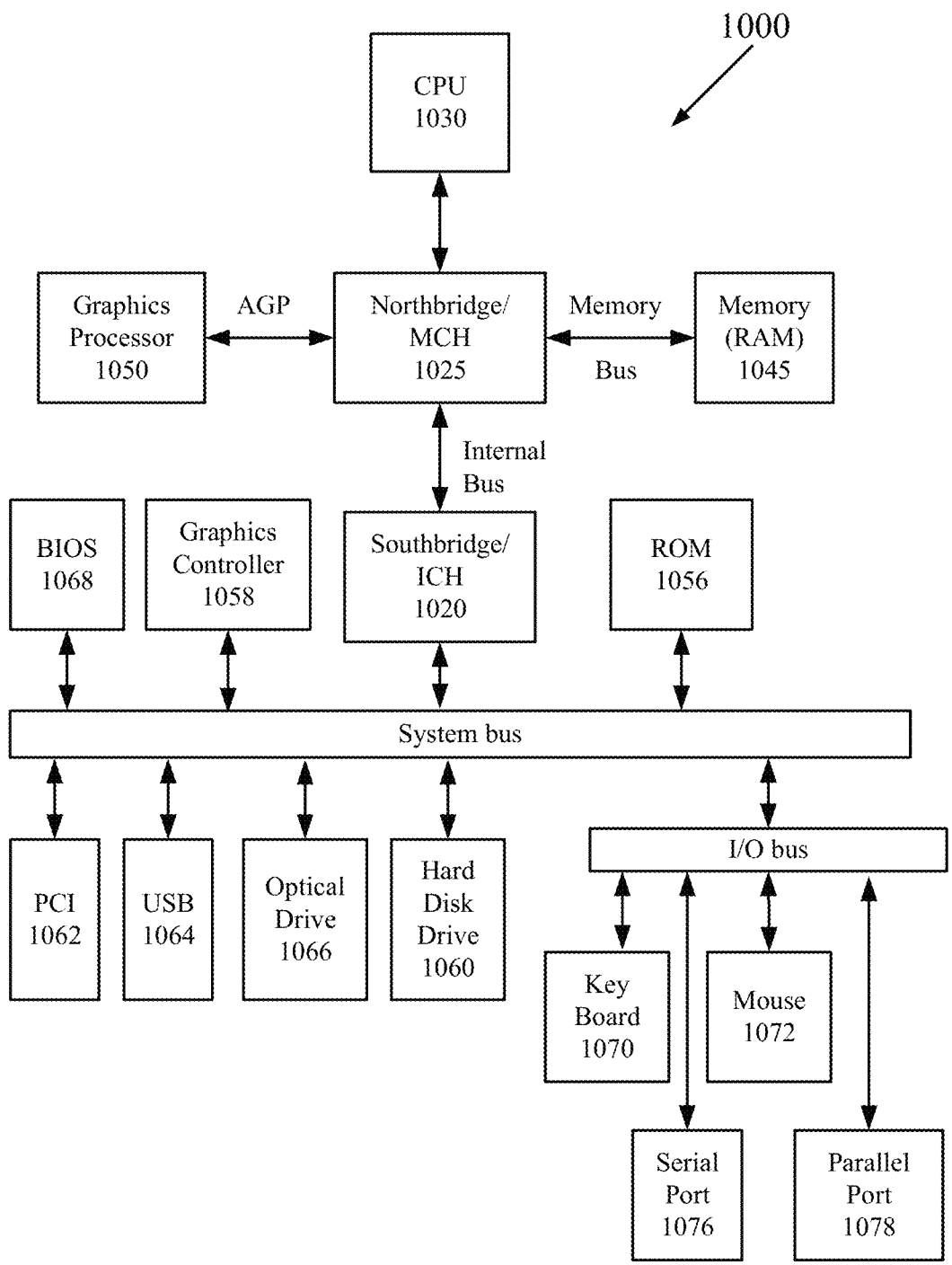
FIG. 10 is an exemplary schematic diagram of a data processing system used within the computing system, according to certain embodiments.

FIG. 10 shows a schematic diagram of a data processing system, according to certain embodiments, for performing the functions of the exemplary embodiments. The data processing system is an example of a computer in which code or instructions implementing the processes of the illustrative embodiments may be located.

In FIG. 10, data processing system 1000 employs a hub architecture including a north bridge and memory controller hub (NB/MCH) 1025 and a south bridge and input/output (I/O) controller hub (SB/ICH) 1020. The central processing unit (CPU) 1030 is connected to NB/MCH 1025. The NB/MCH 1025 also connects to the memory 1045 via a memory bus, and connects to the graphics processor 1050 via an accelerated graphics port (AGP). The NB/MCH 1025 also connects to the SB/ICH 1020 via an internal bus (e.g., a unified media interface or a direct media interface). The CPU Processing unit 1030 may contain one or more processors and even may be implemented using one or more heterogeneous processor systems.

Figure 11:
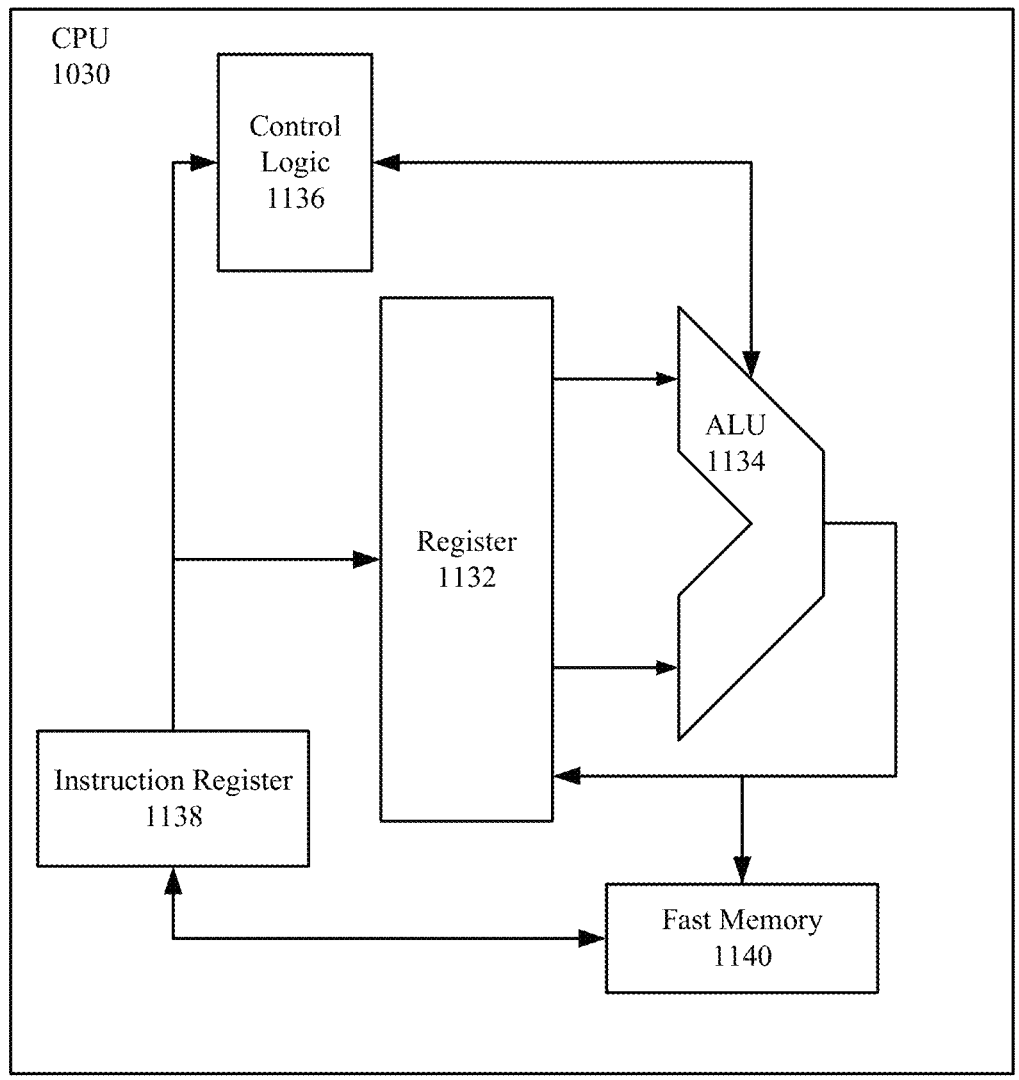
FIG. 11 is an exemplary schematic diagram of a processor used with the computing system, according to certain embodiments.

For example, FIG. 11 shows one implementation of CPU 1030. In one implementation, the instruction register 1138 retrieves instructions from the fast memory 1140. At least part of these instructions are fetched from the instruction register 1138 by the control logic 1136 and interpreted according to the instruction set architecture of the CPU 1030. Part of the instructions can also be directed to the register 1132. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 1134 that loads values from the register 1132 and performs logical and mathematical operations on the loaded values according to the instructions. The results from these operations can be feedback into the register and/or stored in the fast memory 1140. According to certain implementations, the instruction set architecture of the CPU 1030 can use a reduced instruction set architecture, a complex instruction set architecture, a vector processor architecture, a very large instruction word architecture. Furthermore, the CPU 1030 can be based on the Von Neuman model or the Harvard model. The CPU 1030 can be a digital signal processor, an FPGA, an ASIC, a PLA, a PLD, or a CPLD. Further, the CPU 1030 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 10, the data processing system 1000 can include that the SB/ICH 1020 is coupled through a system bus to an I/O Bus, a read only memory (ROM) 1056, universal serial bus (USB) port 1064, a flash binary input/output system (BIOS) 1068, and a graphics controller 1058. PCI/PCIe devices can also be coupled to SB/ICH 888 through a PCI bus 1062.

The PCI devices may include, for example, Ethernet adapters, add-in cards, and PC cards for notebook computers. The Hard disk drive 1060 and CD-ROM 1066 can use, for example, an integrated drive electronics (IDE) or serial advanced technology attachment (SATA) interface. In one implementation the I/O bus can include a super I/O (SIO) device.

Further, the hard disk drive (HDD) 1060 and optical drive 1066 can also be coupled to the SB/ICH 1020 through a system bus. In one implementation, a keyboard 1070, a mouse 1072, a parallel port 1078, and a serial port 1076 can be connected to the system bus through the I/O bus. Other peripherals and devices that can be connected to the SB/ICH 1020 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry or based on the requirements of the intended back-up load to be powered.

Figure 12:
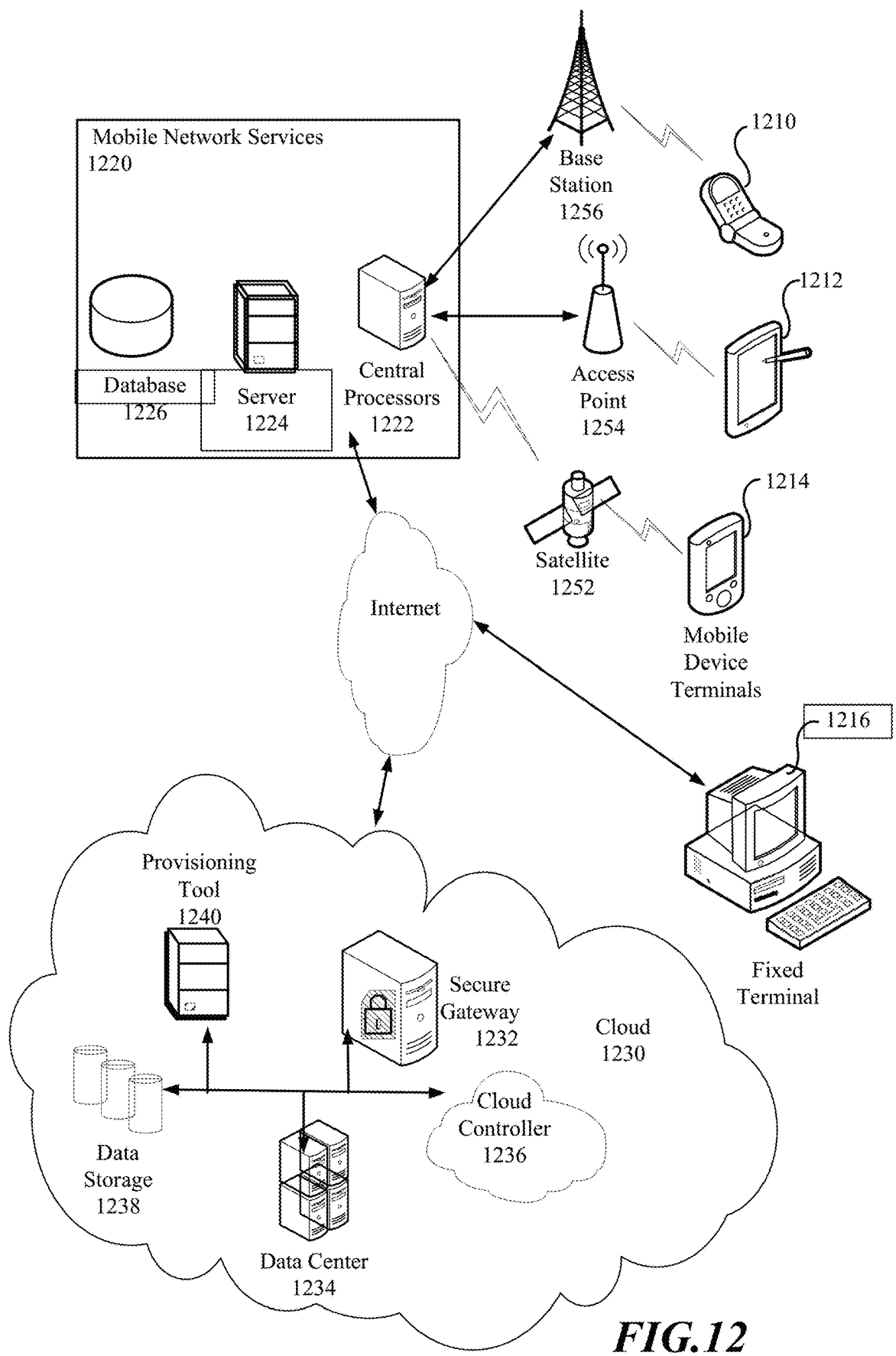
FIG. 12 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 12, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Numerous modifications and variations of the present disclosure are possible in light of the above teachings. It is therefore to be understood that within the scope of the appended claims, the invention may be practiced otherwise than as specifically described herein.

The invention claimed is:

1. A blind signal estimation method for single-input multiple-output systems performed by a receiver comprising:
   receiving, by two or more receiver antennas of the receiver, an observed signal y(t) comprising an input signal s(t), an additive noise term w(t) and a channel response term h(t);
   forming a data matrix Y using the observed signals y(t) from the two or more receiver antennas;
   computing a singular value decomposition of the data matrix Y and generating a unitary matrix $V^H$;
   generating a unitary matrix $V_s^H$ using right singular vectors of the unitary matrix $V^H$;
   generating a parameter matrix Q using the unitary matrix $V_s^H$ obtained from the singular value decomposition of the data matrix Y;
   forming a Toeplitz signal matrix $\widehat{Sk}$ by multiplying the parameter matrix Q by the unitary matrix $V_s^H$; and
   estimating the input signal using the Toeplitz signal matrix $\widehat{Sk}$.

2. The method of claim 1, wherein the additive noise term w(t) is zero mean, or asymptotically zero.

3. The method of claim 1, wherein each observed signal y(t) comprises a first term comprising the product of the input signal s(t), the channel response term H (t) and the additive noise term w(t).

4. The method of claim 1, wherein the observed signal y(t) is measured by the two or more receiver antennas for a total of N samples.

5. The method of claim 4, wherein forming the data matrix Y comprises:
   forming, for each of the N measured observed signals y(t), a signal vector by grouping the observed signals y(t) from each of the two or more receiver antennas; and
   forming the data matrix Y by aggregating the signal vectors.

6. The method of claim 1, wherein generating the parameter matrix Q comprises:
   minimizing a cost function to generate a parameter vector; and
   reshaping the parameter vector to form the parameter matrix Q.

7. The method of claim 1, wherein the input signal is estimated by averaging over the diagonals of the Toeplitz signal matrix $\widehat{Sk}$.

8. The method of claim 1, wherein the receiver comprises 2, 4, 8, 16, 32, 64, 128, or 256 receiver antennas.

9. The method of claim 1, wherein the receiver is a mobile phone.

10. The method of claim 1, wherein the input signal comprises image data.

11. A system for blind signal estimation comprising:
    a transceiver comprising a transmitter antenna configured to transmit an input signal to a receiver;
    the receiver comprising:
    two or more transmitter antennas configured to receive the input signal; and
    a processing module configured to perform a method including:
    receiving, by the two or more receiver antennas of the receiver, an observed signal y(t) comprising the input signal s(t) an additive noise term w(t) and a channel response term h(t);
    forming a data matrix Y using the observed signals from the two or more receiver antennas;
    computing a singular value decomposition of the data matrix Y and generating a unitary matrix $V^H$;
    generating a parameter matrix Q using the unitary matrix $V_s^H$ obtained from the singular value decomposition of the data matrix Y;
    forming a Toeplitz signal matrix $\widehat{Sk}$ by multiplying the parameter matrix Q by the unitary matrix $V_s^H$; and
    estimating the input signal using the Toeplitz signal matrix $\widehat{Sk}$.

12. The system of claim 11, wherein the observed signal y(t) is measured by the two or more receiver antennas for a total of N samples and wherein forming the matrix Y comprises:
    forming, for each of the N measured observed signals y(t), a signal vector by grouping the observed signals y(t) from each of the two or more receiver antennas; and
    forming the data matrix Y by aggregating the signal vectors.

13. The system of claim 11, wherein generating the parameter matrix Q comprises:
    minimizing a cost function to generate a parameter vector; and
    reshaping the parameter vector to form the parameter matrix Q.

14. The system of claim 11, wherein the transceiver and the receiver are mobile phones.

* * * * *